US012677979B2

(12) United States Patent    (10) Patent No.:   US 12,677,979 B2

Hazelton et al.    (45) Date of Patent:   Jul. 14, 2026

(54) POUR OVER BEVERAGE MAKER

(71) Applicant: Helen of Troy Limited, St. Michael (BB)

(72) Inventors: Lance E. Hazelton, Maplewood, NJ (US); Mathieu Zastawny, Jersey City, NJ (US); Dio Climaco Cavero, North Merrick, NY (US)

(73) Assignee: KAZ EUROPE SÀRL, Bussigny (CH)

( * ) Notice: Subject to any disclaimer, the term of this patent is extended or adjusted under 35 U.S.C. 154(b) by 722 days.

(21) Appl. No.: 17/881,965

(22) Filed: Aug. 5, 2022

(65) Prior Publication Data

US 2024/0041240 A1    Feb. 8, 2024

(51) Int. Cl.
*A47J 31/02*    (2006.01)
*A47J 31/44*    (2006.01)

(52) U.S. Cl.
CPC .............. *A47J 31/02* (2013.01); *A47J 31/446* (2013.01)

(58) Field of Classification Search
CPC .... A47J 31/02; A47J 31/4482; A47J 31/4485; A47J 31/60; A47J 31/469; A47J 31/061; A47J 45/10; A47J 36/10; A47J 31/446
USPC ................... 99/323, 279, 284, 290, 293, 295
See application file for complete search history.

(56) References Cited

U.S. PATENT DOCUMENTS 4,867,993 A * 9/1989 Nordskog ............... A47J 31/02
                                           426/82
5,894,786 A 4/1999 Miya 9,044,082 B2 6/2015 Kusuma
9,221,582 B2 12/2015 Wheeler et al.
D778,668 S 2/2017 Hojo
9,723,942 B2 8/2017 Do
10,051,987 B2 8/2018 Bebo
D873,607 S 1/2020 Day, Jr.
D888,497 S 6/2020 Cai
D928,771 S 8/2021 Barnett
11,149,902 B2 10/2021 Barnett
2017/0231418 A1 * 8/2017 Bebo ................... A47J 31/0626
                                           99/323

OTHER PUBLICATIONS

OXO Pour-Over Coffee Maker with Water Tank; https://www.oxo.com/categories/coffee-tea/brew/pour-over-coffee-maker-with-water-tank.html, publicly available prior to Aug. 5, 2022. [Retrieved from the Internet Aug. 5, 2022].

* cited by examiner

*Primary Examiner* — Phuong T Nguyen
(74) *Attorney, Agent, or Firm* — RANKIN, HILL & CLARK LLP

(57) ABSTRACT

A pour over beverage maker includes an infusion container and a liquid tank. The infusion container includes a base, a rim defining an open end of the container, and a wall portion made of a flexible material. The wall portion is disposed between and interconnects the base and the rim. The container is configured to be positioned in one of a folded condition in which the wall portion is folded into itself and an extended use condition. The liquid tank is configured to mount atop the container when the container is in the extended condition. A lower portion of the liquid tank is received in the container open end and has at least one liquid outlet allowing associated liquid within the tank to flow into the container when mounted atop the container. The liquid tank is configured receive and store therein the container when in the folded condition.

11 Claims, 8 Drawing Sheets

POUR OVER BEVERAGE MAKER

BACKGROUND

"Pour over" beverage makers for extracting coffee or tea are very popular. In these devices, coffee grinds or tea leaves as an infusion material is placed in an infusing container of some kind that in turn is typically placed on top of a drinking vessel. Hot water or other liquid is then "poured over" or otherwise introduced into the infusing container on top of the infusion material, and the liquid is permitted to form the resulting coffee or tea. The resulting coffee or tea then permitted to progress a filter media under the action of gravity and then exits the infusing container and drips downwardly into the drinking vessel. While many different designs of pour over beverage makers have been implemented, there is still room for improvement.

SUMMARY

According to one aspect, a pour over beverage maker comprises an infusion container and a liquid tank. The infusion container includes a base, a rim defining an open end of the container, and a wall portion made of a flexible material. The wall portion is disposed between and interconnects the base and the rim. The container is configured to be positioned in one of a folded, stored condition in which the wall portion is folded into itself and an extended, use condition in which the container is configured to receive an associated infusion material. The liquid tank is configured to mount atop the container when the container is in the extended condition. A lower portion of the liquid tank is received in the container open end and has at least one liquid outlet allowing associated liquid within the tank to flow into the container and over the associated infusion material when mounted atop the container. According to one embodiment, the liquid tank is configured receive and store therein the container when in the folded, stored condition.

According to another aspect, a method of using a pour over beverage maker is provided. The pour over beverage maker includes an infusion container for positioning atop an associated liquid vessel and a liquid tank. The method comprises configuring the container to be selectively positioned in one of a folded, stored condition and an extended, use condition; when in the extended condition, mounting the liquid tank atop the container so that a lower portion of the liquid tank having at least one liquid outlet is received in the container; and when in the folded condition, placing the container in the liquid tank with a base of the container supported on an inner surface of the liquid tank and a rim of the container located at or below an upper edge of the liquid tank.

DETAILED DESCRIPTION

It should, of course, be understood that the description and drawings herein are merely illustrative and that various modifications and changes can be made in the structures disclosed without departing from the present disclosure. Spatially relative terms may be used to describe an element and/or feature's relationship to another element(s) and/or feature(s) as, for example, illustrated in the figures. It will be understood that the spatially relative terms are intended to encompass different orientations of the exemplary pour over beverage maker in use in addition to the orientation depicted in the figures. Further, any term of degree used herein, such as "substantially", means a reasonable amount of deviation of the modified word is contemplated such that the end result is not significantly changed.

Figure 1:
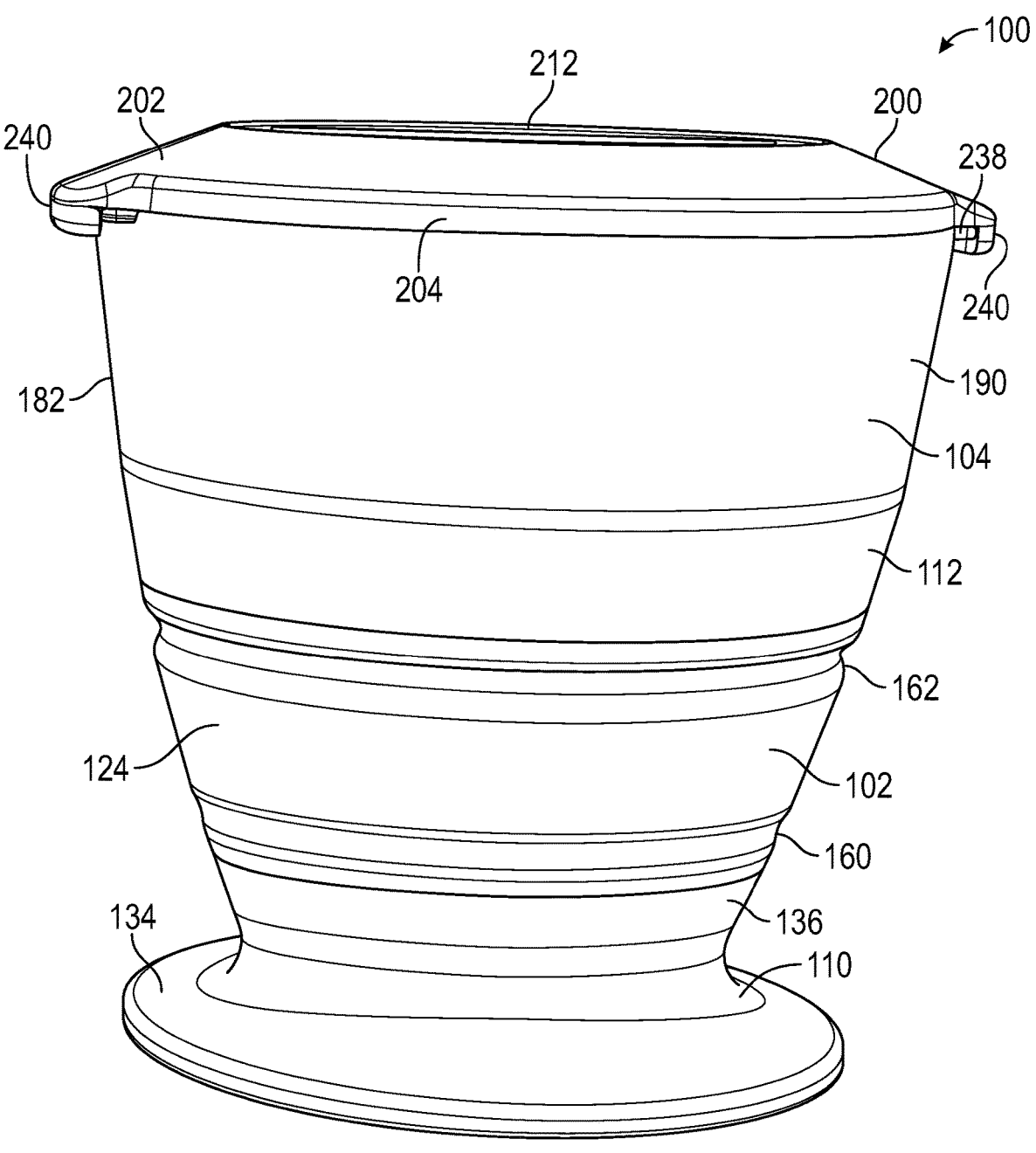
FIG. 1 is a perspective view of a pour over beverage maker according to the present disclosure, the pour over beverage maker generally including an infusion container, a liquid tank and a lid.
Figure 2:
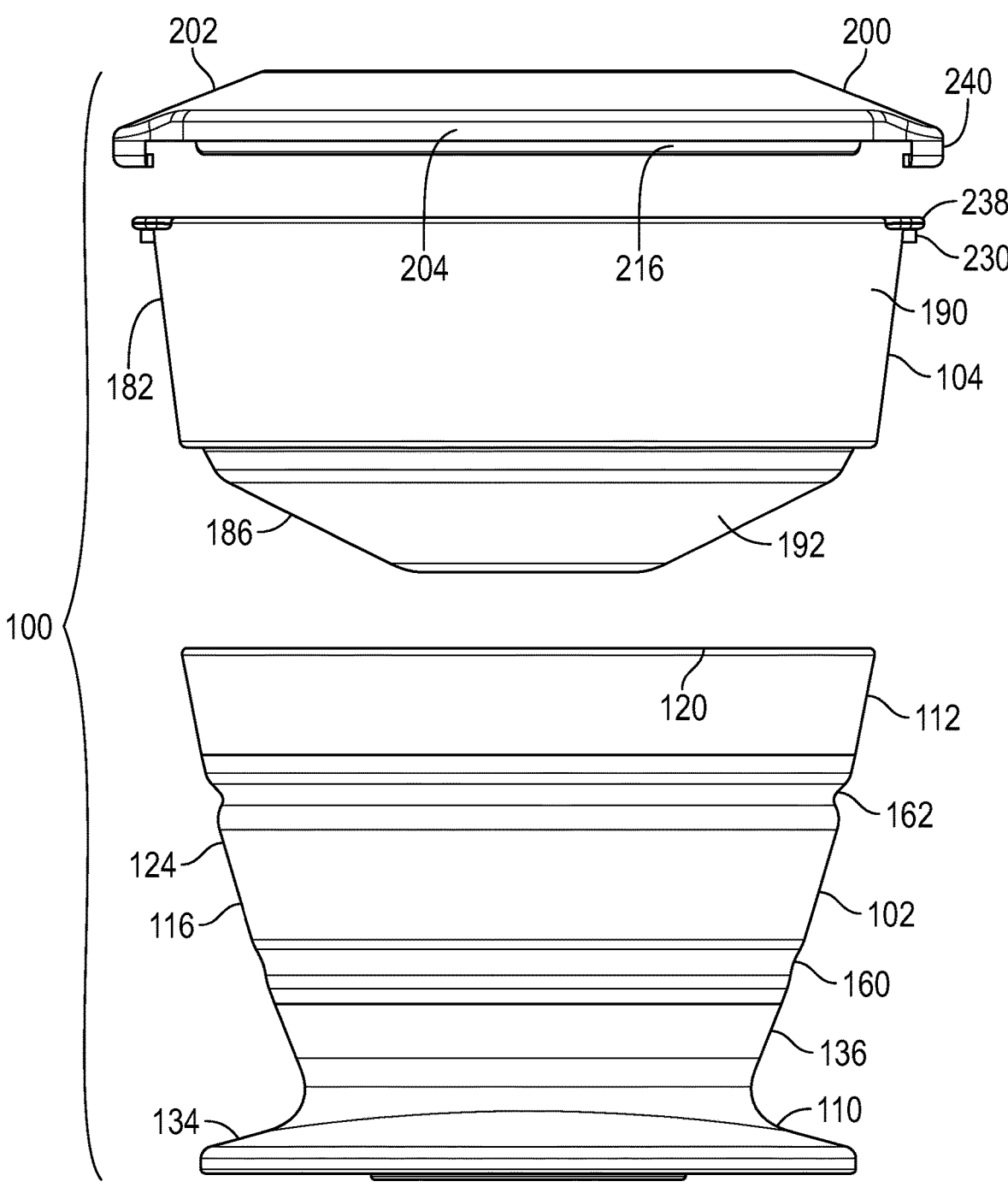
FIG. 2 is an exploded view of FIG. 1.
Figure 3:
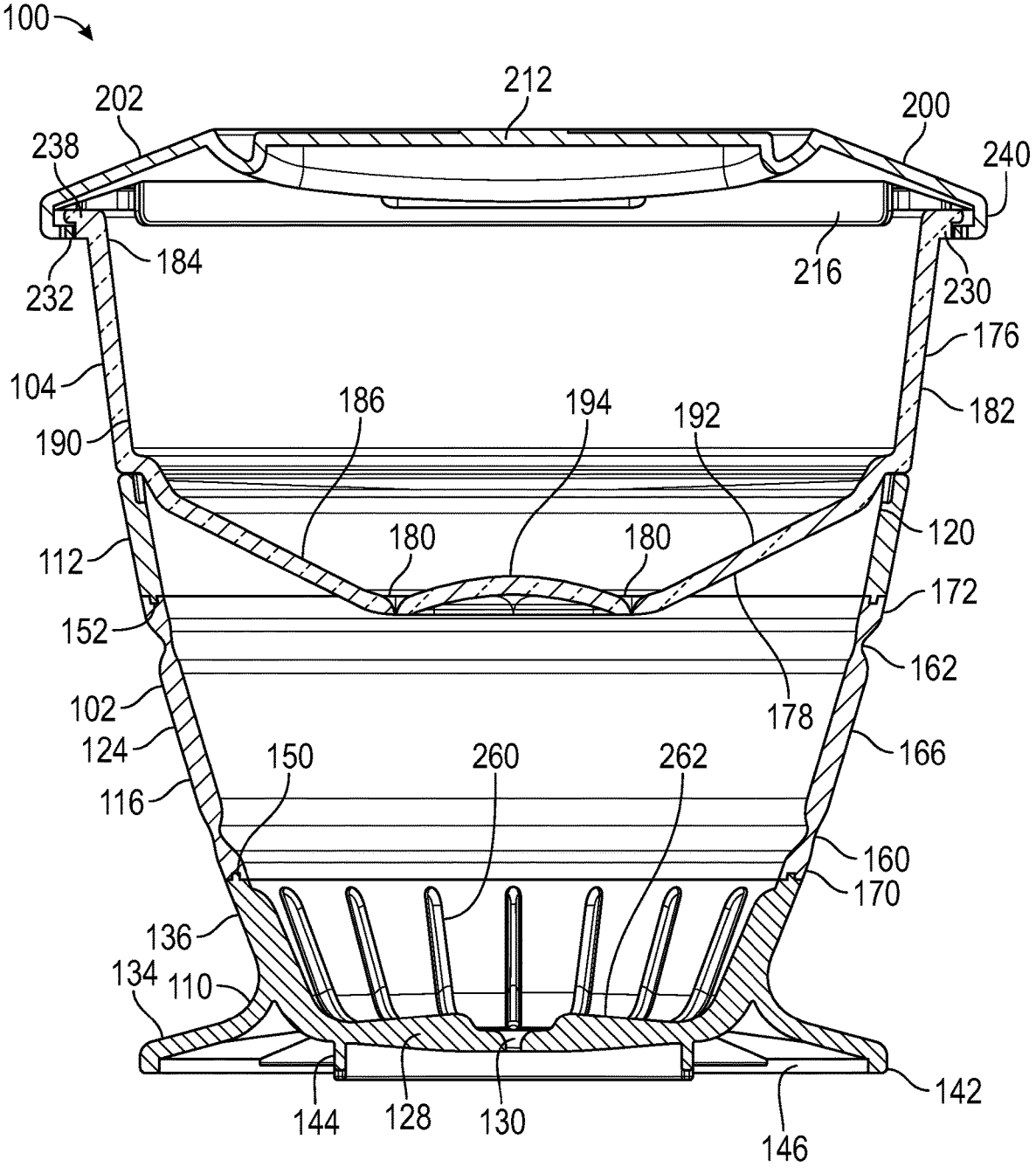
FIG. 3 is a cross-sectional view of FIG. 1.
Figure 4:
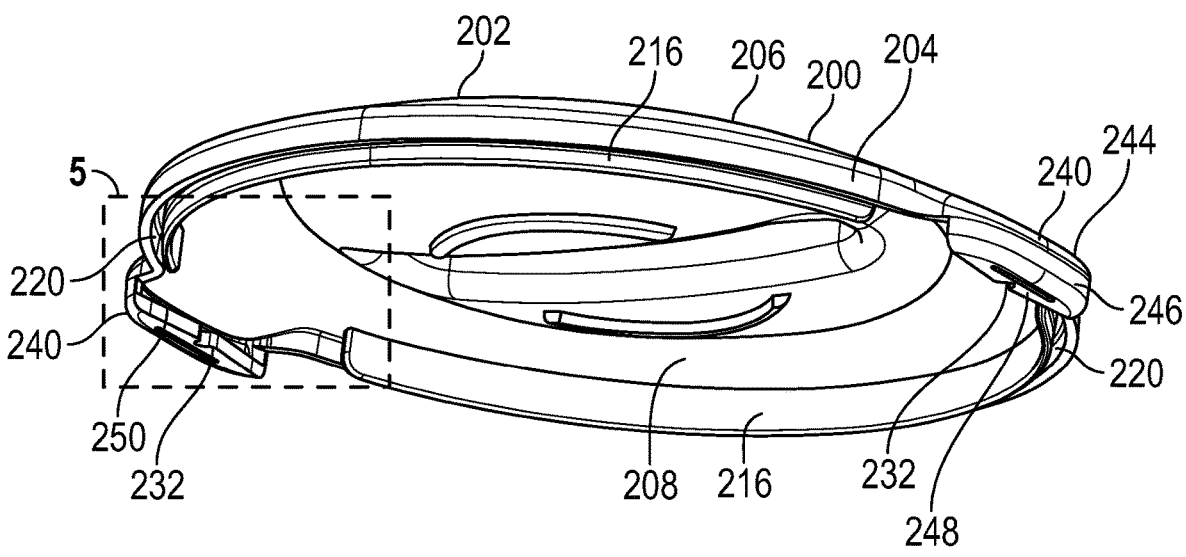
FIG. 4 is a perspective view of the lid of FIG. 1.
Figure 5:
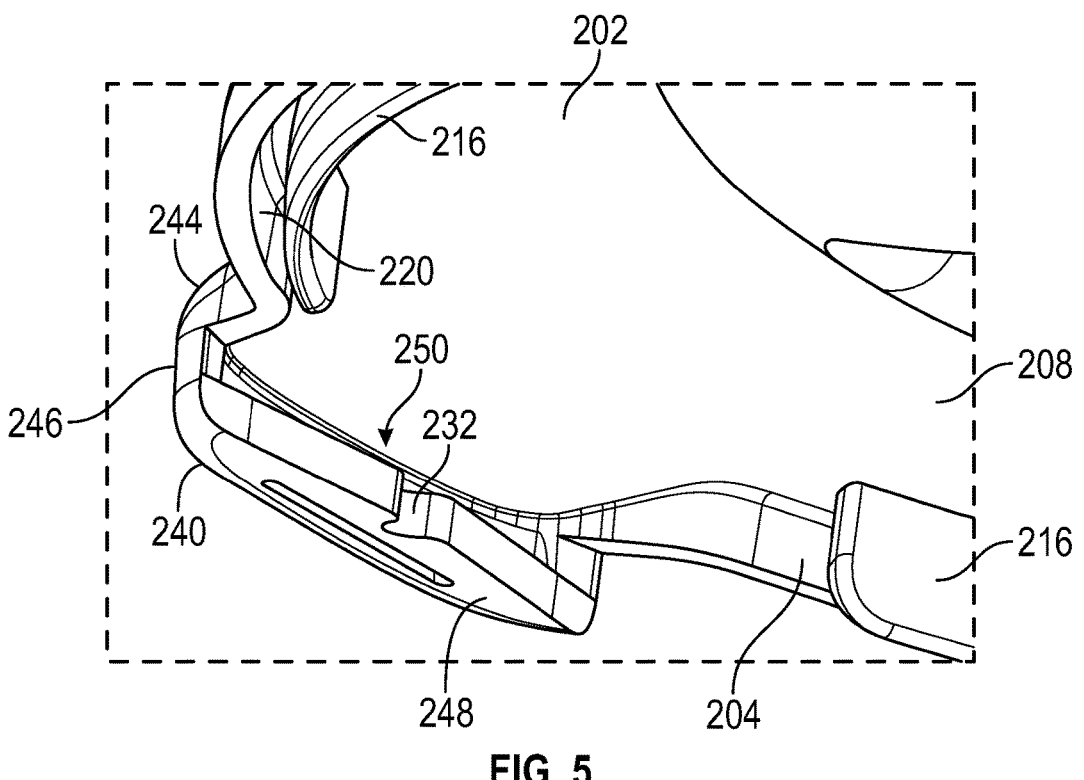
FIG. 5 is a detailed view of FIG. 4.

Referring now to the drawings, wherein like numerals refer to like parts throughout the several views, FIGS. 1-3 illustrate a pour over beverage maker 100 according to the present disclosure. The pour over beverage maker 100 comprises an infusion container 102 configured to receive an associated infusion material (i.e., coffee grinds or tea leaves) and a liquid tank 104. In side view, the infusion container 102 can be conical or otherwise tapered radially outwardly or funnel shaped, and generally includes a base 110 adapted to support the container 102 atop an associated beverage vessel (i.e., a cup, mug, and the like), a rim 112 that defines an open end 120 of the container 102, and a wall portion 116 disposed between and interconnecting the base 110 and the rim 112. At least a portion of the base, the rim and the wall portion together define a sidewall 124 of the container 102 that extends from the open end 120 to a bottom wall 128 of the container 102. The base 110 defines the bottom wall 128 of the container 102. The sidewall 124 and the bottom wall 128 of the container define a brewing chamber, where the bottom wall has an outlet opening 130 formed therein for the passage of the resulting coffee or tea into an open end of the associated beverage vessel. The base 110 further includes supporting flange 134 extended outwardly from the sidewall 124 for supporting the container 102 atop the associated beverage vessel, and can include a neck portion 136 that connects to the wall portion 116. As shown, the base 110 is a unitary, one-piece component of the pour over beverage maker 100 that integrally includes the bottom wall 128, the supporting flange 134 and the neck portion 136. In the depicted aspect, an end portion 140 of the supporting flange 134 is turned downward in a height direction of the pour over beverage maker 100, and a substantially annular wall 142 can depends from the bottom wall 128. The end portion 140 of the supporting flange and the wall 142 define a receiving space 146 for an open end of the associated vessel, thereby providing stability for the container 102 when positioned atop the associated vessel.

According to the present disclosure, the wall portion 116 of the container 102 is formed of an elastomeric, flexible material, and the base 110 and the rim 112 are formed a material different than the flexible material. In the disclosed aspect, the base 110 and the rim 112 can be formed of a substantially rigid material, be it the same substantially rigid material or differing substantially rigid materials. By way of example, the wall portion 116 can be fabricated using any flexible rubber material, such as, but not limited to, a thermoplastic elastomer and a food-grade silicone. The base 110 and the rim 112 can be made of any substantially rigid material such as, but not limited to, polypropylene, acrylonitrile butadiene styrene, nylon, metal or metal alloy (i.e., stainless steel), wood, etc. As such, the term "substantially rigid" used herein includes both rigid and semi-rigid materials. It should be appreciated that the wall portion 116 may be bonded or co-molded with each of the base 110 and the rim 112, with each of the base and the rim including an attachment feature (i.e., a respective rib 150, 152) to facilitate the connection of the wall portion 116 to the base and the rim.

Figure 8:
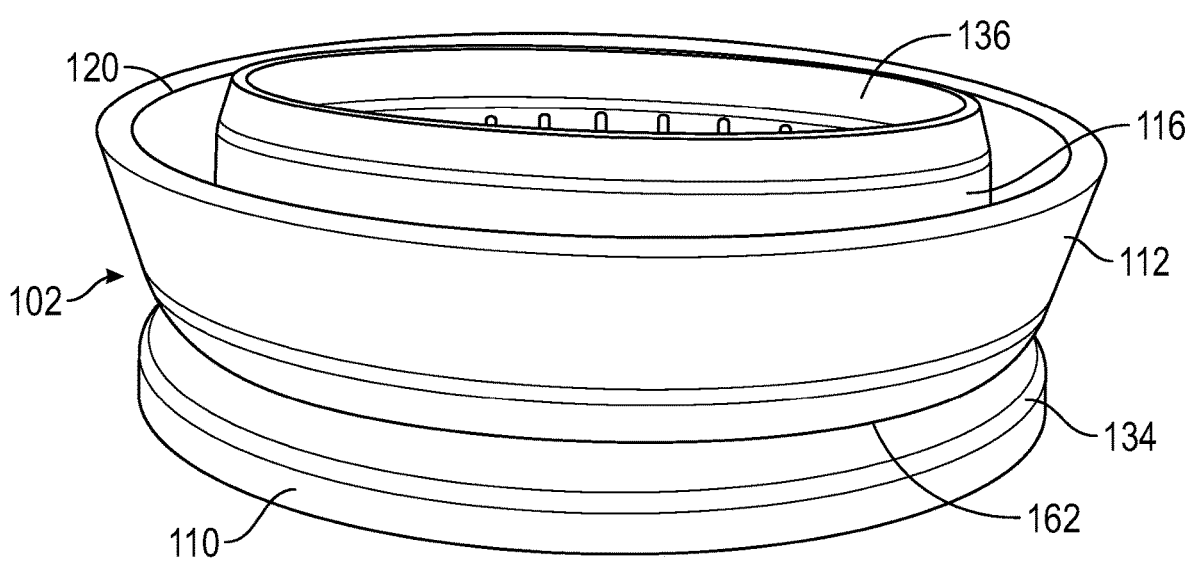
FIG. 8 is a perspective view of the infusion container in a folded, stored condition.

The infusion container 102 is configured to be positioned in one of an extended, use condition (FIG. 1) in which the container is configured to receive the associated infusion material (i.e., coffee grinds or tea leaves) and a folded, stored condition (FIG. 8) in which the wall portion 116 is folded into itself. In the folded condition, the container is configured such that the rim 112 substantially surrounds the neck portion 136 of the base 110. To this end, the wall portion 116 is formed with at least one circumferential crease 160 having a reduced thickness as compared to the remaining wall portion, thereby allowing the wall portion 116 to fold into itself at the at least one crease 160 when in the folded condition. In the depicted embodiment, the at least one crease 160 is a first circumferential crease and the wall portion 116 is formed with a second circumferential crease 162 also having a similarly reduced thickness. The first and second creases 160, 162 extend approximately parallel to one another around the wall portion 116 with the first crease 160 located closer to the base 110 as compared to the rim 112 in the height direction of the pour over beverage maker 100, and the second crease 162 located closer to the rim 112 as compared to the base 110 in the height direction. In the depicted aspect, the first crease 160 is located immediately adjacent the base 110, and the second crease 162 is located immediately adjacent the rim 112, such the wall portion 116 defines an intermediate section 166 (i.e., a section of the wall portion 116 between the first and second creases 160, 162) having an enlarged dimension in the height direction as compared to lower and upper sections 170, 172 of the wall portion (i.e., sections of the wall portion 116 defined between the respective first and second creases 160, 162 and the respective base 110 and rim 112 (see FIG. 3)). As shown in FIG. 8, the wall portion 116 is foldable along the first and second creases 160, 162.

Figure 6:
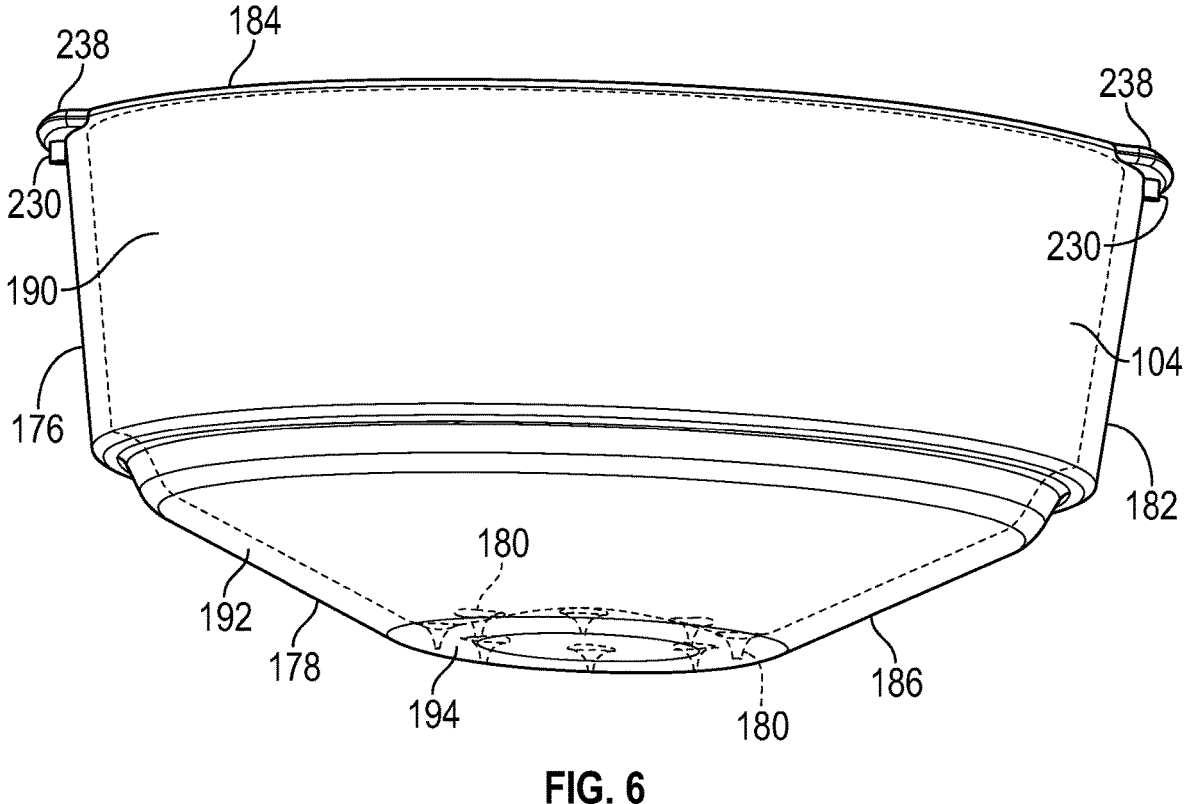
FIG. 6 is a perspective view of the liquid tank of FIG. 1.

In FIGS. 1 and 3, the liquid tank 104 is configured to mount atop the container 102 when the container is in the extended, use condition. The liquid tank 104 has an upper portion 176 and a lower portion 178 relative to the height direction. The lower portion 178 of the liquid tank 104 is received in the container open end 120 when mounted atop the container 102 in the extended condition. The lower portion 178 has at least one liquid outlet 180 allowing associated liquid within the liquid tank 104 to flow into the container 102 and over the associated infusion material when mounted atop the container. Specifically, as shown in FIG. 6, the liquid tank 104 includes a sidewall 182 defining an open end or end portion 184 and a base wall 186. The sidewall 182 defines a substantially cylindrical shaped basin portion 190 and the base wall 186 defines a funnel portion 192 which transitions to an optional arcuate portion 194. The at least one liquid outlet 180 is provided at the junction of the funnel portion and the arcuate portion, ensuring that the associate liquid in the liquid tank 104 is directed to the at least one outlet 180. In the depicted aspect, the at least one liquid outlet is a plurality of liquid outlets 180 that are spaced from one another. Further shown, each liquid outlet 180 is funnel shaped so as to control disbursement of associated liquid over the associated infusion material; although, this is not required. Additionally, the container 102 and/or liquid tank 104 can be sized such that the lower portion 178 is located immediately adjacent the second crease 162, thereby allowing adequate spacing between the liquid outlets 180 in the lower portion of the water tank of the associated infusion material located in the container for proper.

With reference to FIGS. 2-6, a lid 200 is adapted to be rotatably mounted to the open end 184 of the liquid tank 104. The lid 200 includes a cover portion 202 and a side portion 204. The cover portion 202 has an outer surface 206 and an inner surface 208 opposite the outer surface. A user grip or handle 212 in the form of a bar is provided on the outer surface 206, allowing the lid to be easily ratably mounted to the liquid tank. Guide walls 216 depend from the inner surface 208 of the cover portion, the guide walls 216 are spaced inwardly from the side portion 204 and together with the side portion define channels 220. The channels 220 are sized to receive the open end 184 of the liquid tank 104. According to the present disclosure, the liquid tank 104 and the lid 200 have a detent arrangement for releasably securing the lid to the open end 184 of the liquid tank. In the depicted aspect, the detent arrangement is defined by at least one tab 230 provided on one of the liquid tank 104 and the lid 200 being selectively received in at least one slot 232 provided in the other of the liquid tank 104 and the lid 200. More particularly, the liquid tank 104 includes ledges or grips 238 extended outwardly from the sidewall 182, and provided beneath each ledge 238 is the tab 230. The lid 200 also includes flaps or grips 240 extended outwardly from the side portion 204. Each flap is substantially C-shaped in cross-section (see FIG. 3) with a top wall 244 as an extension of the cover portion 202, a side wall 246, and a bottom wall 248. With this arrangement, each flap 240 defines a space 250 sized and dimensioned to receive one of the ledges 238. Accordingly, with this detent arrangement, to secure the lid 200 on the liquid tank 104, the lid is first positioned with the flaps 240 offset from (i.e., not aligned with) the ledges 238, and the lid is seated atop the liquid tank with the open end 184 of the liquid tank located in the channels 220. The lid 200 is then rotated atop the liquid tank 104 to bring the flaps 240 into alignment with the ledges 238, the ledges 238 moving into the spaces 250 defined by the flaps 240, which in turn moves the tabs 230 into the slots 232 formed in the bottom walls 248 of the flaps 240.

Figure 7:
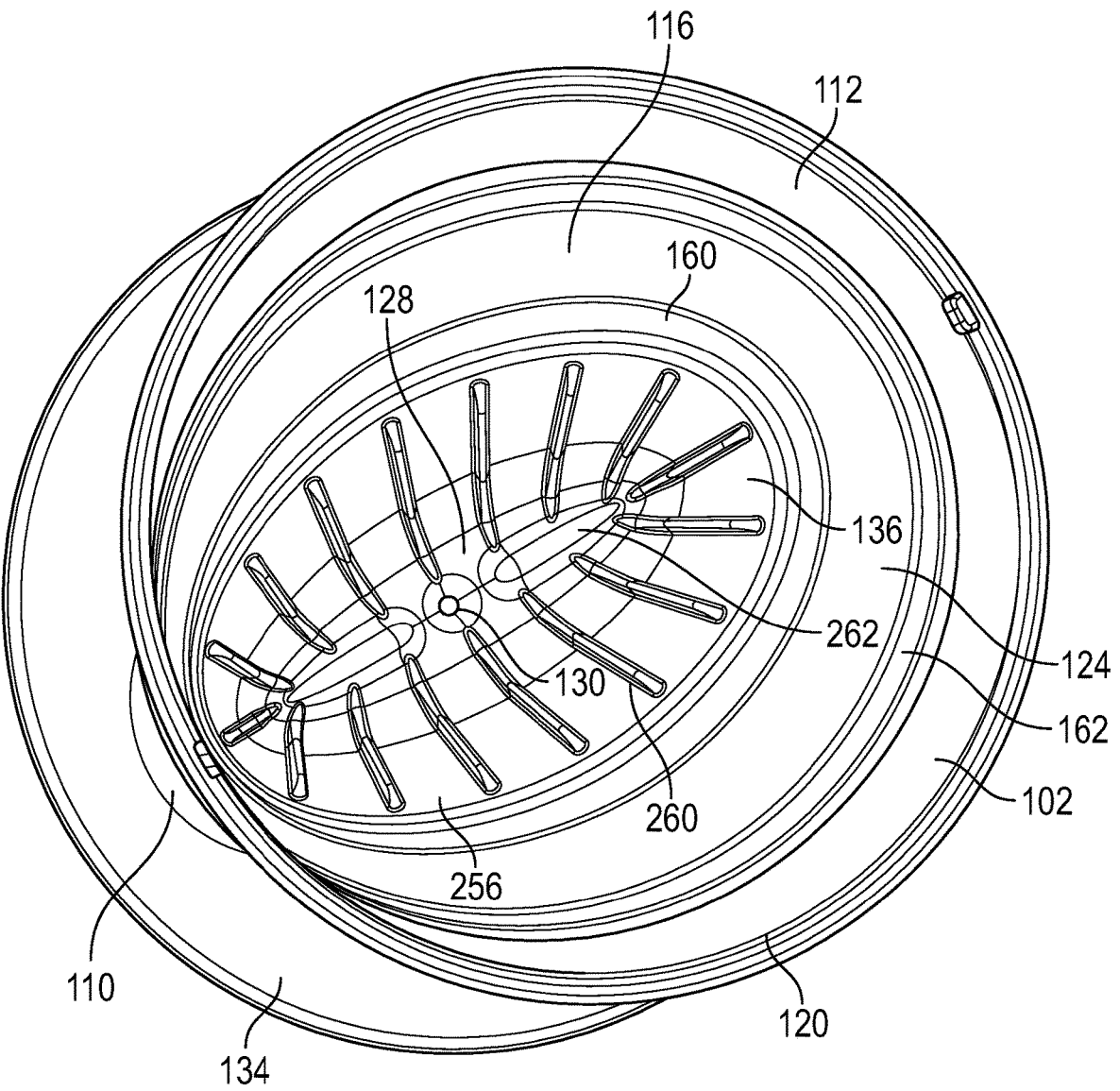
FIG. 7 is an inside perspective view of the infusion container of FIG. 1.
Figure 10:
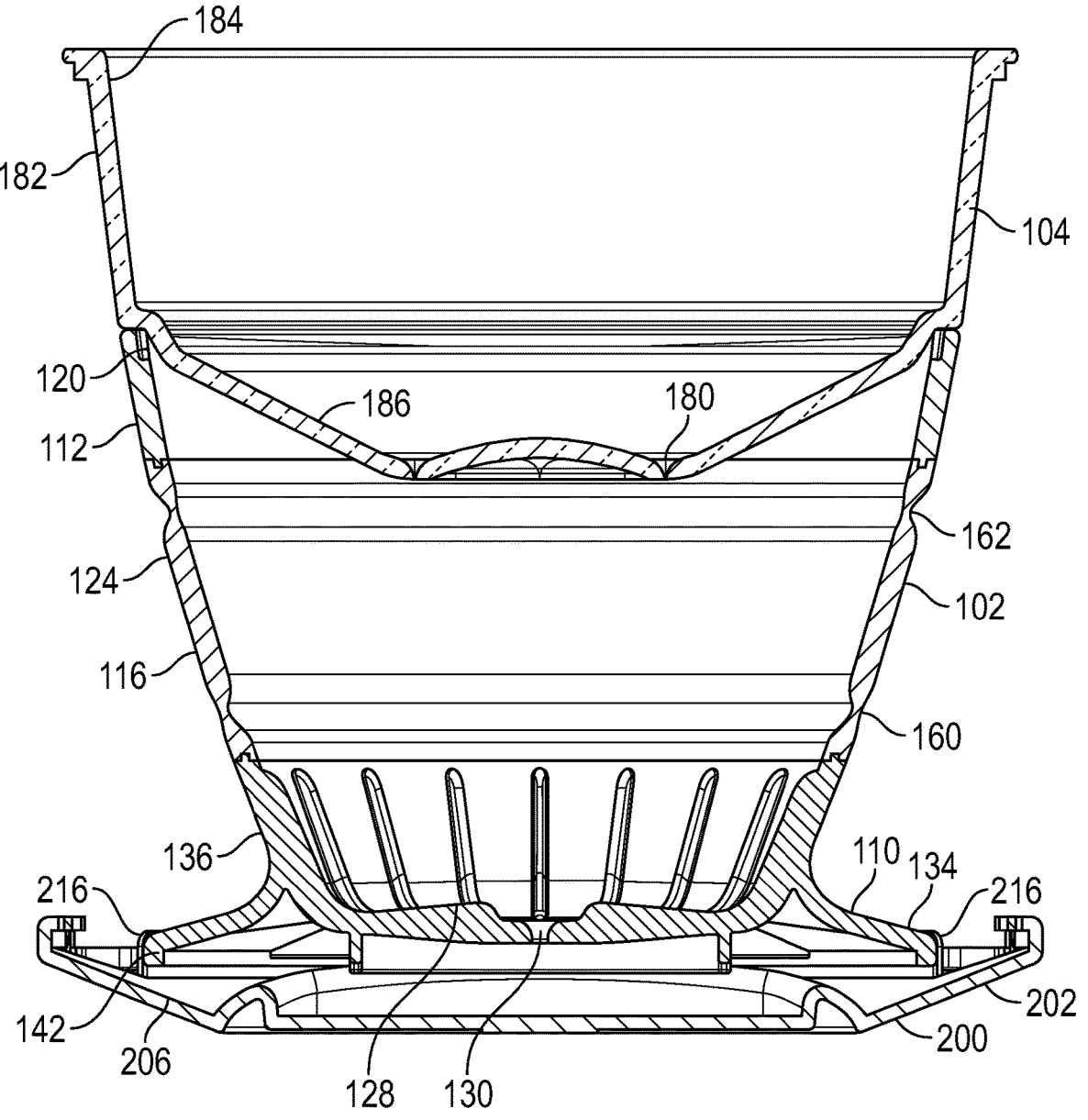
FIG. 10 is a cross-sectional view of the infusion container seated atop a bottom surface of the lid, which can serve as a drip tray for the pour over beverage maker after use.

With reference to FIGS. 3 and 7, an inner surface 256 of the base 110 includes a plurality of first ribs 260 extended in a height direction of the container 102. The first ribs extend substantially between the bottom wall 128 and the connection of the neck portion 136 to the wall portion 116 of the container. The inner surface of the base 110 can also include a pair of second ribs 262 that extend on the bottom wall 128 from the outlet opening 130. It should be appreciated that a removable filter and/or a disposable filter is typically used during the brewing process. The filter enhances filtration by disposing the filter paper in the container 102 prior to adding the associated infusion material (i.e., coffee grinds or tea leaves). The first and second ribs 260, 262 are designed to prevent the filter from sticking to the inside of the container 102 after use. Further, after the brewing process, the lid 200 can be used as a drip tray for the container when cleaned. This arrangement is depicted in FIG. 10, where the lid is upside down and the supporting flange 134 of the base 110 is seated on the inner surface 206 of the lid 200 and secured against the guide walls 216 of the lid 200.

Figure 9:
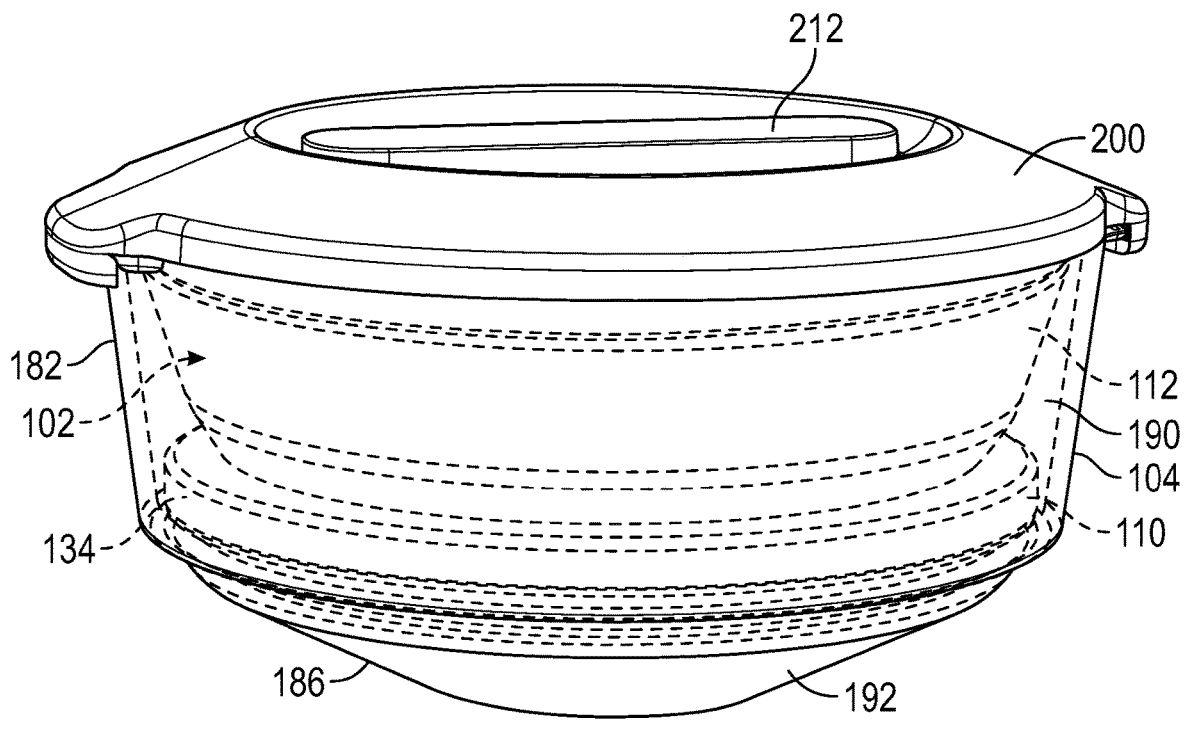
FIG. 9 is a perspective view of the infusion container in the folded, stored condition positioned in the liquid tank and secured therein by the lid connected to the liquid tank.

FIG. 8 depicts the infusion container 102 in the folded condition in which the wall portion 116 is folded into itself about the first and second creases 160, 162. In the folded condition, the rim 112 substantially surrounds the neck portion 136 of the base 110 and the neck portion can slightly project above the rim in the height direction of the container. FIG. 9 depicts the infusion container 102 in the folded condition (shown in hidden lines) received and stored in the basin portion 190 of the liquid tank 104. When stored, the supporting flange 134 of the base 110 is seated on the base wall 186 of the liquid tank 104, and a height of the container 102 in the folded condition is less than a height of the sidewall 182 of the liquid tank such that the rim 112 and/or neck portion 136 of the container is located at or below an upper edge of the liquid tank 104. The lid 200 when mounted on the liquid tank 104 as described above then secures the container 102 in the folded condition within the liquid tank 104 when stored. By configuring the container 102 in such a manner that it can be securely stored in the liquid tank 104 when in the folded condition, the present design permits a user to easily store and transport the pour over beverage maker 100.

According to another aspect, a method of using the pour over beverage maker 100 is provided. Again, the pour over beverage maker 100 includes the infusion container 102 for positioning atop an associated liquid vessel and the liquid tank 104. The method comprises configuring the container 102 to be selectively positioned in one of a folded, stored condition and an extended, use condition; when in the extended condition, mounting the liquid tank 104 atop the container 102 so that the lower portion 178 of the liquid tank having the at least one liquid outlet 180 is received in the container; and when in the folded condition, placing the container 102 in the liquid tank 104 with the base 110 of the container supported on an inner surface of the liquid tank 104 and the rim 112 of the container located at or below an upper edge of the liquid tank.

The exemplary method further includes providing the lid 200, and mounting the lid 200 atop the liquid tank 104 to secure the container 102 in the folded condition within the liquid tank. The container 102 includes the wall portion 116 made of a flexible material, the wall portion disposed between and interconnecting the base 110 and the rim 112, the wall portion 116 includes the at least one crease 160, 162, and the method includes folding the wall portion 116 into itself at the at least one crease 160, 162 to place the container 102 in the folded condition.

It will be appreciated that the above-disclosed embodiments and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A pour over beverage maker comprising: an infusion container including:

a base, a rim defining an open end of the container, and a wall portion made of a flexible material, the wall portion disposed between and interconnecting the base and the rim, wherein the container is configured to be positioned in a folded, stored condition in which the wall portion is folded into itself, and the container is configured to be positioned in an extended, use condition in which the container is configured to receive an associated infusion material; and a liquid tank configured to mount atop the container when the container is in the extended condition, a lower portion of the liquid tank received in the container open end and having at least one liquid outlet allowing associated liquid within the tank to flow into the container and over the associated infusion material when mounted atop the container, wherein the wall portion includes at least one crease allowing the wall portion to fold into itself at the at least one crease when in the folded condition, wherein the liquid tank is configured to received and store the container when in the folded condition with the rim of the container located at or below an upper edge of the liquid tank.

2. The pour over beverage maker of claim 1, including a lid adapted to be rotatably mounted to an open upper portion of the liquid tank, the lid securing the container within the liquid tank when stored in the liquid tank.

3. The pour over beverage maker of claim 2, where the lid and the liquid tank have a detent arrangement for securing the lid to the liquid tank.

4. The pour over beverage maker of claim 1, including a lid adapted to be rotatably mounted to an open upper portion of the liquid tank, the lid further adapted to support the base thereon and defines a drip tray for the container.

5. The pour over beverage maker of claim 1, wherein the wall portion is formed of an elastomeric material.

6. The pour over beverage maker of claim 1, wherein each of the base and the rim is formed of a material different than the flexible material of the wall portion, the base integrally includes an upwardly extended neck portion, the neck portion fixedly connected to the wall portion.

7. The pour over beverage maker of claim 6, wherein an inner surface of the base includes a plurality of ribs extended in a height direction of the container, the ribs terminating at the connection of the neck portion to the wall portion.

8. The pour over beverage maker of claim 1, wherein the at least one crease includes a first crease and a second crease, the first crease is located closer to the base as compared to the rim, and the second crease is located closer to the rim as compared to the base, wherein the wall portion is foldable along the first and second creases.

9. The pour over beverage maker of claim 8, wherein the first crease is located immediately adjacent the base, and the second crease is located immediately adjacent the rim.

10. The pour over beverage maker of claim 1, wherein the liquid tank includes a basin portion and a funnel portion, the basin portion is configured receive and store therein the container when in the folded condition.

11. The pour over beverage maker of claim 1, wherein when in the folded condition the rim substantially surrounds the base.

* * * * *